United States Patent
Pinkerton

(10) Patent No.: US 10,250,300 B1
(45) Date of Patent: Apr. 2, 2019

(54) WIRELESS CONDITION MONITORING SENSOR WITH NEAR FIELD COMMUNICATION INSECTION HARDWARE

(71) Applicant: Aktiebolaget SKF, Gothenburg (SE)

(72) Inventor: Alexander Pinkerton, Aberdeen (GB)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 16/019,632

(22) Filed: Jun. 27, 2018

(51) Int. Cl.
*G21C 17/00* (2006.01)
*H04B 5/00* (2006.01)
*G01K 13/12* (2006.01)

(52) U.S. Cl.
CPC .......... *H04B 5/0043* (2013.01); *G01K 13/12* (2013.01)

(58) Field of Classification Search
CPC ...... H04B 5/0043; G01K 13/12; G21C 17/00; G01F 17/00
USPC ................. 455/41.1, 41.2; 702/185, 54, 56
See application file for complete search history.

(56) References Cited

U.S. PATENT DOCUMENTS

| | | | |
|---|---|---|---|
| 7,364,144 B2* | 4/2008 | Nordmeyer | B60G 17/01933 267/64.27 |
| 7,636,031 B2* | 12/2009 | Mirmobin | H04Q 9/00 235/435 |
| 2006/0167659 A1* | 7/2006 | Miyasaka | B61F 15/20 702/185 |
| 2015/0172790 A1* | 6/2015 | Delgado Restituto | H04Q 9/00 340/870.02 |

* cited by examiner

*Primary Examiner* — Sonny Trinh
(74) *Attorney, Agent, or Firm* — Bryan Peckjian; SKF USA Inc. Patent Dept.

(57) ABSTRACT

A system including a condition monitoring sensor is provided. The condition monitoring sensor including a first near field communication transponder and a memory. The condition monitoring sensor being affixed to and monitoring conditions of a mechanical system. The condition monitoring sensor storing a unique sensor identifier within the first near field communication transponder or the memory. The system including an inspection device comprising a second near field communication transponder. An electronic coupling of the first and second near field communications is implemented based on a tapping operation between the condition monitoring sensor and the inspection device. The inspection device executes a query to the condition monitoring sensor via the electronic coupling to procure the unique sensor identifier. The inspection device executes an inspection operation in response to procuring the unique sensor identifier from the condition monitoring sensor.

18 Claims, 2 Drawing Sheets

WIRELESS CONDITION MONITORING SENSOR WITH NEAR FIELD COMMUNICATION INSECTION HARDWARE

BACKGROUND

Rail maintenance crews inspect locomotives, including rail bogie wheels, axle-boxes, etc. Presently, rail maintenance crews manually check rolling stock of carriages of the locomotives at intervals set by government legislation and/or maintenance schedules. For instance, visual inspection of the rolling stock is a naked-eye viewing to determine that nothing is obviously wrong (e.g., a visibly damaged suspension, visible wheel faults, and the like). Further, audio inspection of the rolling stock is when rail maintenance crews implement wheel tapping to determine that nothing is wrong. Wheel tapping includes when an experienced individual taps a wheel of the rolling stock with a long handled hammer and listens for any anomaly in a chime that the tapped wheel makes. Manual (visual/audio) inspection of locomotives are time consuming, require a particular expertise that few individuals within the rail maintenance crews possess, and include inherent flaws do to natural human error.

SUMMARY

According to one or more embodiments, a system including a condition monitoring sensor is provided. The condition monitoring sensor including a first near field communication transponder and a memory. The condition monitoring sensor being affixed to and monitoring conditions of a mechanical system. The condition monitoring sensor storing a unique sensor identifier within the first near field communication transponder or the memory. The system including an inspection device comprising a second near field communication transponder. An electronic coupling of the first and second near field communications is implemented based on a tapping operation between the condition monitoring sensor and the inspection device. The inspection device executes a query to the condition monitoring sensor via the electronic coupling to procure the unique sensor identifier. The inspection device executes an inspection operation in response to procuring the unique sensor identifier from the condition monitoring sensor.

According to one or more embodiments, the system can also be implemented as a computer program product and/or method.

According to one or more embodiments, a method for executing an inspection operation by a system comprising a condition monitoring sensor and an inspection device is provided. The condition monitoring sensor comprises a first near field communication transponder and a memory. The condition monitoring sensor is affixed to and monitoring conditions of a mechanical system. The condition monitoring sensor stores a unique sensor identifier within the first near field communication transponder or the memory. The inspection device comprises a second near field communication transponder. The method executable by the system comprises executing a tapping operation between the condition monitoring sensor and the inspection device; implementing an electronic coupling of the first and second near field communications based on the tapping operation; executing, by the inspection device, a query to the condition monitoring sensor via the electronic coupling to procure the unique sensor identifier; and executing, by the inspection device, an inspection operation in response to procuring the unique sensor identifier from the condition monitoring sensor.

According to one or more embodiments, the method can also be implemented in a system or as a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

In view of the above, embodiments disclosed herein may include a system, method, and/or computer program product (herein a system) that enables rail maintenance crews to inspect a status of a carriage wheel by electronically coupling an inspection device (e.g., a mobile computing device, such as smart a phone or a tablet) to a condition monitoring sensor attached to that carriage wheel. The electronically coupling of the inspection device and the condition monitoring sensor is initiated by a tapping operation of the wireless capabilities therein and supports an inspection operation subsequent thereto. The technical effects and benefits of the system include eliminating problems associated with visual/audio inspections, as well as the time consuming nature and expertise requirements of visual/audio inspections, and eliminating problems associated with complex software that necessitates rail maintenance crew training, thereby limiting both availability and flexibility of these crews. The technical effects and benefits of the system also include automated wheel tap hammer operations that provide digital confirmations that each wheel was actually inspected. Thus, embodiments described herein are necessarily rooted in the processors and memories of the system to perform proactive operations to overcome problems specifically arising in the realm of visual/audio inspections.

Figure 1:
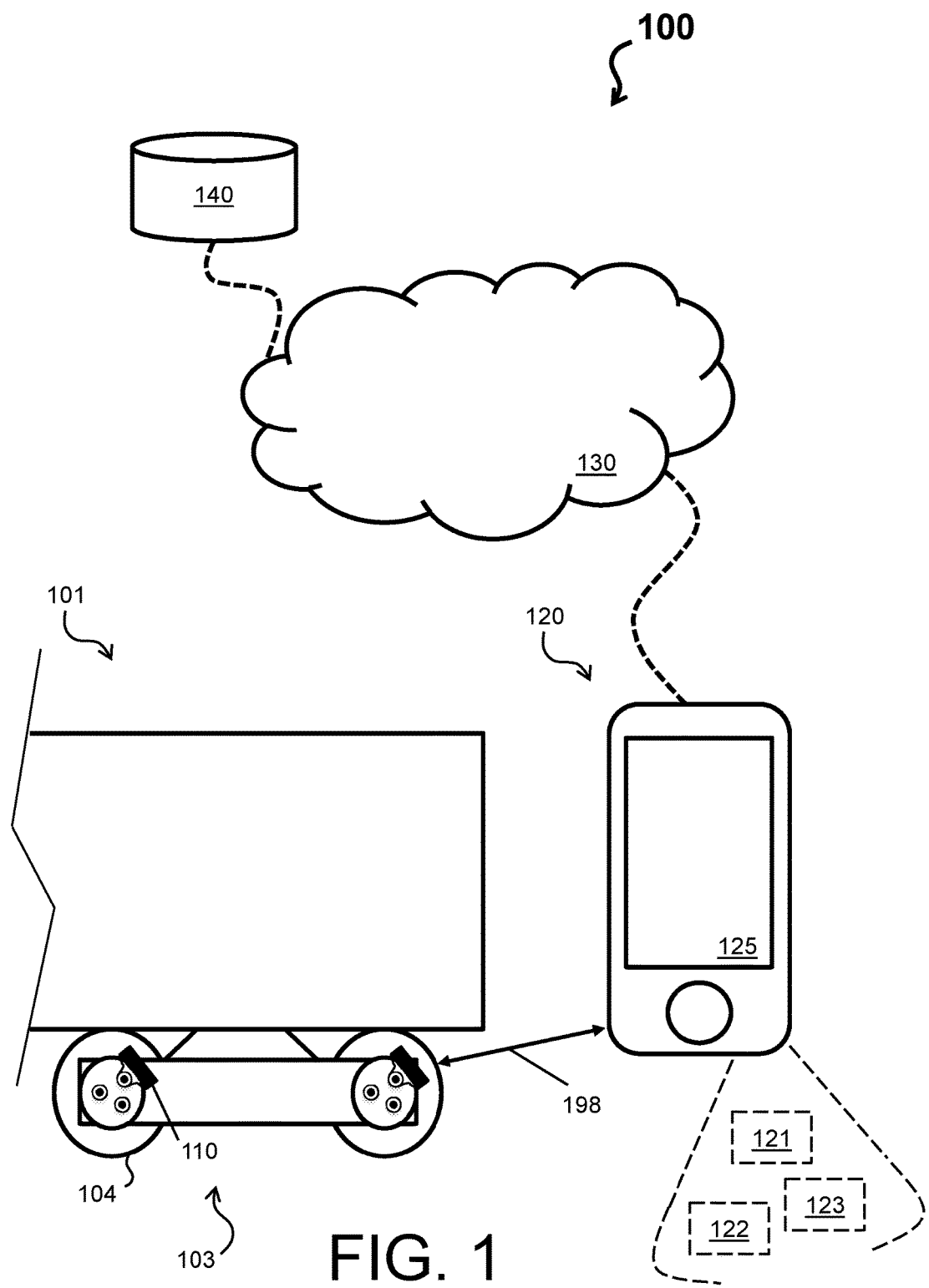
FIG. 1 depicts a system in accordance with one or more embodiments.

Turning now to FIG. 1, for example, an environment includes a railcar 101 including at least one axle-box 103. The axle-box 103 includes one or more wheels 104 attached thereto by fastening elements. Note that, while only a single axle-box is show, most railcars have four axle-boxes with eight wheels attached thereto (for example, by a rail bogie wheel axle-box bearing). In general, a bearing housing of the axle-box 103 includes a rail bogie wheel axle-box bearing that supports a corresponding wheel 104 and a bolt configuration that attached the bearing housing to the axle-box 103.

Further, a system 100 is generally shown in accordance with one or more embodiments. The system 100 can be an electronic, computer framework comprising and/or employing any number and combination of computing device and networks utilizing various communication technologies, as described herein. The system 100 can be easily scalable, extensible, and modular, with the ability to change to different services or reconfigure some features independently of others.

The system 100 includes at least one of a plurality of condition monitoring sensors 110. Each condition monitoring sensor 110 includes a housing with at least a contact surface, at least one sensor (e.g., sensors for vibration, temperature, etc.), a data collector (e.g., a processor and a memory as described herein), data transmission electronics (e.g., a wireless modem and/or a near field communication (NFC) transponders), and an attachment component that affixes the condition monitoring sensor 110 to one of the plurality of securing bolts of the wheel 104. The attachment component can be any bracket, flange, or the like that attaches the condition monitoring sensor 110 to a mechanical system to be monitored. The contact surface is an outward facing portion of the housing that receives an inspection device 120.

For example, each condition monitoring sensor 110 can be a compact, battery-operated device that measures vibration and temperature of the wheel 104 to which it is attached (e.g., specifically, being attached to least one of the fastening elements of that wheel 104, which can be a rail bogie wheel). Via the data transmission electronics, each condition monitoring sensor 110 can wirelessly transmit static and dynamic data to external devices, servers, and systems. In accordance with one or more embodiments, the memory and/or the NFC transponder of each condition monitoring sensor 110 can store or be associated with a unique sensor identifier. For instance, an NFC transponder can be pre-programmed with a unique sensor identifier associated with a wireless modem internal to a condition monitoring sensor 110 and/or can be pre-programmed with details relating to that specific sensor and mounting location (e.g., whether it is mounted on or near a rail bogie wheel axle-box bearing). Further, at various pre-defined intervals (such as while the locomotive is moving), the condition monitoring sensor 110 records the static and dynamic data (e.g., condition monitoring data).

The system 100 includes the inspection device 120 including one or more central processing units (CPU(s)) (collectively or generically referred to as a processor 121). The processor 121 is coupled via a system bus to a system memory 122 and various other components. The system memory 122 can include a read only memory (ROM) and a random access memory (RAM). The ROM is coupled to the system bus and may include a basic input/output system (BIOS), which controls certain basic functions of the system 100. The RAM is read-write memory coupled to the system bus for use by the processor 121. Software for execution on the system 100, such as the inspection operation described herein, may be stored in the system memory 122. The system memory 122 is an example of a tangible storage medium readable by the processor 121, where the software is stored as instructions for execution by the processor 121 to cause the system 100 to operate, such as is described herein with reference to FIGS. 2-4. Examples of computer program product and the execution of such instruction are discussed herein in more detail.

The inspection device 120 includes one or more input/output (I/O) adapters 123 coupled to the system bus. The one or more input/output adapters 123 may include a small computer system interface (SCSI) adapter that communicates with the system memory 122 and/or any other similar component. The one or more input/output adapters 123 may include an NFC transponder that communicates with the NFC transponders of the condition monitoring sensors 110. For example, the one or more input/output adapters 123 can interconnect the system bus with a network 130, which may be an outside network, enabling the system 100 to communicate with other such systems (i.e., the server 140).

Note that the processor 121, the system memory 122, and the one or more input/output adapters 123, while shown as dashed boxes external to the inspection device 120 for ease of clarity in depicting the system 100, are clearly internal components of the inspection device 120. The inspection device 120 can also include a display 125 (e.g., touch display) for presenting a user interface, interface buttons, a global positioning system, audio/video components, etc. In accordance with one or more embodiments, the display 125 is utilized to enter log-in credentials, enter carriage identification numbers, provide visual commands, etc.

The system 100 also includes the network 130 and the server 140. The network 130 includes a set of computers connected together, sharing resources. The network 1230 can be any type of network, including a local area network (LAN), a wide area network (WAN), or the Internet, as described herein. The server 140 comprises a processor and a memory (as described herein) and provides various functionalities to the inspection device 120, such as sharing and storing data, providing resources, or performing computations. In accordance with one or more embodiments, the server 140 is a cloud hosted condition monitoring system that shares and stores the unique sensor identifier associated each condition monitoring sensor 110 and/or the details relating to each condition monitoring sensor 110 and respective mounting locations. Further, at various pre-defined intervals (such as while the locomotive is moving), the cloud hosted condition monitoring system records and stores the static and dynamic data (e.g., condition monitoring data) from the condition monitoring sensors 110, along with processes a basic health state of carriage wheels and future analysis and reporting.

In operation, the inspection device 120 performs an inspection operation for each of the condition monitoring sensors 110. The inspection operation initiates based on the inspection device 120 coming into contact (as represented by double arrow 198) with each condition monitoring sensor 110.

Figure 2:
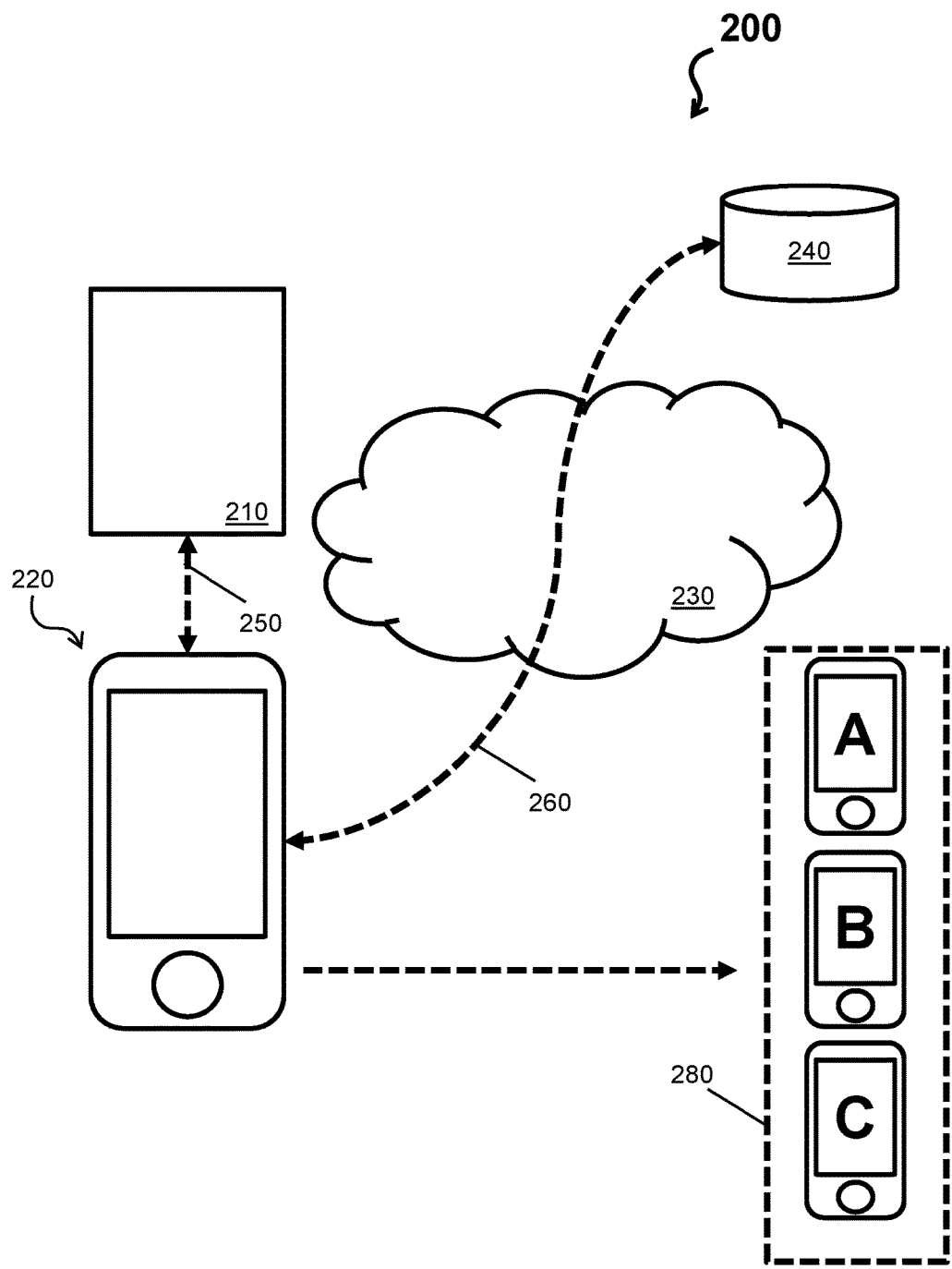
FIG. 2 depicts a schematic of an interaction between a condition monitoring sensor, an inspection device, and server in accordance with one or more embodiments.

Turning now to FIG. 2, a schematic 200 is depicted in accordance with one or more embodiments. The schematic 200 includes a condition monitoring sensors 210 (shown independent of the wheel for ease of explanation), an inspection device 220, a network 230, and a server 240. Further, the schematic 200 depicts tapping and inspection operations represented by dashed-double arrow 250 and communication operations represented by dashed-double arrow 260.

For example, a tapping operation when is the inspection device 220 is physically placed against the condition monitoring sensor 210 and the NFC transponders identify each other for electronic coupling. Once the inspection device 220 is physically placed against the condition monitoring sensor 210 secured to a wheel under inspection, the inspection device 220 queries (e.g., see the dashed-double arrow 250) the NFC transponder within the condition monitoring sensor 210 and determines a unique sensor identifier stored therein.

The inspection device 220 then uses this unique sensor identifier to query (e.g., see the dashed-double arrow 260) the server 240 (e.g., cloud hosted condition monitoring system) via the network 230. For instance, during this query, the inspection device 220 passes user log-in credentials and the unique sensor identifier to the server 240, the server 240 internally authenticates these user log-in credentials and the unique sensor identifier, and the server 240 returns data, such as a most recent health status of the wheel being inspected associated with the condition monitoring sensor 210. In accordance with one or more embodiments, the data includes last inspection data, last inspector name, serial numbers of the mechanical equipment, whether a wheel flat was previously detected (flats or flat portions of the wheel can result in significant damage to rails of a track), whether a bearing fault was previously detected, a wheel diameter, an engineering report if available, a work order if available, an inspection schedule if available, etc.

Once the inspection device 220 has received the data from the server 240, the inspection device 220 displays an interface. In accordance with one or more embodiments, the interface includes a temperature of a rail bogie wheel axle-box bearing, an internal (mechanical) condition of the rail bogie wheel axle-box bearing, and an indication as to whether flats on a wheel being inspected are present. The interface can further provide options for selection, such as perform inspection, review reports, review work orders, etc. In accordance with one or more embodiments, the one or more mechanical conditions can be presented and/or selected based on a traffic light rubric as described with respect to dashed block 280. The traffic light rubric includes A, a green indication that all systems and operations are normal; B, an amber indication that one or more systems or operations are in alert status; and C, a red indication that one or more systems or operations are in danger status.

Subsequent data is entered through the interface and submitted to the server by the inspection device 220. This subsequent data can include inspection information, a time of each inspection operation, a confirmation that a required inspection was completed, an updated wheel diameter, work orders, a location, a name of the inspector who completed the inspection, revisions to mechanical serial numbers and the like, other feedback and observations, etc. Once the wheel has been inspected and health confirmed, the inspection operation is repeated for all other wheels.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a condition monitoring sensor comprising a first near field communication transponder and a memory, the condition monitoring sensor being affixed to and monitoring conditions of a mechanical system, the condition monitoring sensor storing a unique sensor identifier within the first near field communication transponder or the memory; and
    an inspection device comprising a second near field communication transponder,
    wherein an electronic coupling of the first and second near field communications is implemented based on a tapping operation between the condition monitoring sensor and the inspection device,
    wherein the inspection device executes a query to the condition monitoring sensor via the electronic coupling to procure the unique sensor identifier, and
    wherein the inspection device executes an inspection operation in response to procuring the unique sensor identifier from the condition monitoring sensor.

2. The system of claim 1, wherein, during the query, the inspection device passes user log-in credentials to the condition monitoring sensor via the electronic coupling, the condition monitoring sensor internally authenticates the user log-in credentials, and the condition monitoring sensor returns the unique sensor identifier.

3. The system of claim 2, wherein the inspection device comprises a display that presents an interface providing the status of the tapping operation, the status of the communication operation, or the health status of the mechanical system.

4. The system of claim 2, wherein the inspection device comprises a display that presents an interface providing the health status of the mechanical system as a green, red, or yellow visual prompt.

5. The system of claim 2, wherein, during the second query, the inspection device passes user log-in credentials and the unique sensor identifier to the server via the network, the server internally authenticates the user log-in credentials and the unique sensor identifier, and the server returns data comprising the health status of the mechanical system associated with the unique sensor identifier.

6. The system of claim 1, the system comprising:
    a server; and
    a network,
    wherein the inspection device executes a communication operation in response to the inspection operation, the communication operation comprising a second query by the inspection device to the server via a network to procure a health status of the mechanical system.

7. The system of claim 1, wherein the mechanical system is an axle-box comprising a bearing housing, a rail bogie wheel axle-box bearing that supports a corresponding wheel, and a bolt configuration that attaches the bearing housing to the axle-box,
    wherein the condition monitoring sensor is affixed to the bolt configuration.

8. The system of claim 1, wherein the condition monitoring sensor comprises a contact surface comprising an outward facing portion of the housing that receives the inspection device, at least one sensor, a data collector comprising a processor and a memory, and data transmission electronics comprising the first near field communication transponder.

9. The system of claim 8, wherein the at least one sensor measures vibrations or temperatures of the mechanical system.

10. A method for executing an inspection operation by a system comprising a condition monitoring sensor and an inspection device, the condition monitoring sensor comprising a first near field communication transponder and a memory, the condition monitoring sensor being affixed to and monitoring conditions of a mechanical system, the condition monitoring sensor storing a unique sensor identifier within the first near field communication transponder or the memory, the inspection device comprising a second near field communication transponder, the method executable by the system comprising:
- executing a tapping operation between the condition monitoring sensor and the inspection device;
- implementing an electronic coupling of the first and second near field communications based on the tapping operation;
- executing, by the inspection device, a query to the condition monitoring sensor via the electronic coupling to procure the unique sensor identifier; and
- executing, by the inspection device, an inspection operation in response to procuring the unique sensor identifier from the condition monitoring sensor.

11. The method of claim 10, wherein, during the query, the inspection device passes user log-in credentials to the condition monitoring sensor via the electronic coupling, the condition monitoring sensor internally authenticates the user log-in credentials, and the condition monitoring sensor returns the unique sensor identifier.

12. The method of claim 10, wherein the system comprises a server and a network,
- wherein the inspection device executes a communication operation in response to the inspection operation, the communication operation comprising a second query by the inspection device to the server via a network to procure a health status of the mechanical system.

13. The method of claim 12, wherein the inspection device comprises a display that presents an interface providing the status of the tapping operation, the status of the communication operation, or the health status of the mechanical system.

14. The method of claim 12, wherein the inspection device comprises a display that presents an interface providing the health status of the mechanical system as a green, red, or yellow visual prompt.

15. The method of claim 12, wherein, during the second query, the inspection device passes user log-in credentials and the unique sensor identifier to the server via the network, the server internally authenticates the user log-in credentials and the unique sensor identifier, and the server returns data comprising the health status of the mechanical system associated with the unique sensor identifier.

16. The method of claim 10, wherein the mechanical system is an axle-box comprising a bearing housing, a rail bogie wheel axle-box bearing that supports a corresponding wheel, and a bolt configuration that attaches the bearing housing to the axle-box,
- wherein the condition monitoring sensor is affixed to the bolt configuration.

17. The method of claim 10, wherein the condition monitoring sensor comprises a contact surface comprising an outward facing portion of the housing that receives the inspection device, at least one sensor, a data collector comprising a processor and a memory, and data transmission electronics comprising the first near field communication transponder.

18. The method of claim 17, wherein the at least one sensor measures vibrations or temperatures of the mechanical system.

* * * * *